United States Patent [19]

Ando et al.

[11] Patent Number: 4,717,933
[45] Date of Patent: Jan. 5, 1988

[54] EXCHANGEABLE LENS FOR USE IN A FOCUS DETECTING DEVICE

[75] Inventors: Makoto Ando, Sakai; Tsuneyo Metabi, Izumi; Toshihiko Ishimura, Habikino, all of Japan

[73] Assignee: Minolta Camera Kabushiki Kaisha, Osaka, Japan

[21] Appl. No.: 775,250

[22] Filed: Sep. 12, 1985

[30] Foreign Application Priority Data

Sep. 12, 1984 [JP] Japan .................. 59-190995

[51] Int. Cl.⁴ .................................................. G03B 3/00
[52] U.S. Cl. .................................... 354/409; 354/195.1
[58] Field of Search ............... 354/400, 195.13, 402, 354/409, 195.1, 195.12, 286; 350/428, 430

[56] References Cited

U.S. PATENT DOCUMENTS

| | | | |
|---|---|---|---|
| 4,298,251 | 11/1981 | Hartmann | 350/430 X |
| 4,483,603 | 11/1984 | Metabi et al. | 354/402 |
| 4,550,993 | 11/1985 | Taniguchi et al. | 354/402 |
| 4,572,638 | 2/1986 | Nakai et al. | 354/286 |

Primary Examiner—W. B. Perkey
Attorney, Agent, or Firm—Burns, Doane, Swecker & Mathis

[57] ABSTRACT

An exchangeable lens includes a lens system which forms an image of a target object on which the lens system is focused, a focus adjusting means manually operable for adjusting the focus of the lens system, a direction signal generating means which generates a direction signal representing the relationship between the operational direction of the focus adjusting means of the lens and change of the camera-to-object distance to be focused on by the lens system and a transmitting means which transmits the signal to a camera on which the exchangeable lens is detachably mounted. The camera includes a focus detecting means which receives a light coming from an object and passing through the lens system, a focus condition determining means which is responsive to the output of the focus detecting means to determine the focus condition and the direction of operation of the focus adjusting means to attain an in-focus condition for the focus adjustment and a display means which indicates the focus condition and the direction of focus adjustment. The display means indicates a proper direction of operation of the focus adjusting means towards an in-focus condition, even if the relationship between the operational direction and change of focus differs with the exchangeable lenses.

5 Claims, 13 Drawing Figures

EXCHANGEABLE LENS FOR USE IN FOCUS DETECTING DEVICE

BACKGROUND OF THE INVENTION

1. Field of the Invention

The present invention relates to an exchangeable lens to be used with a lens exchangeable camera, and in particular it pertains an exchangeable lens for use with a camera having a so-called focus aid function of the through-the-lens (TTL) range finding or focus detecting type wherein a focus detecting element receives the light coming from a target object and having passed through the objective lens, and detects the focus condition of the lens, and the focus condition and the direction of defocus are displayed, for example, in the camera viewfinder field to indicate to the user whether the focusing operation should be stopped or continued and in what direction the focusing should be adjusted. The exchangeable lens to which the present invention is applied, includes a zoom lens with the function of macro or close-up focusing.

2. Description of the Prior Art

As the focus aid function is only for indicating the necessity and direction of the focus adjustment in accordance with the focusing condition and direction of defocus detected through the focus detecting element, exchangeable lenses to be used with the same type camera must be designed such that their focus adjusting members are rotated in the same direction for the change of the focused distance in the same direction. If the direction of the rotation of the focus adjusting member is different with the interchangeable lenses, it is likely to occur that the focus aid device indicates for some lenses the direction of focus adjustment which is opposite to the direction in which the focus adjustment must be made. In such a case, if the user adjusts the focusing in accordance with the indication of the focus aid device, the focus adjusting member will be rotated in the direction opposite from the in-focus position and the objective lens will never be focussed.

Figure 12:
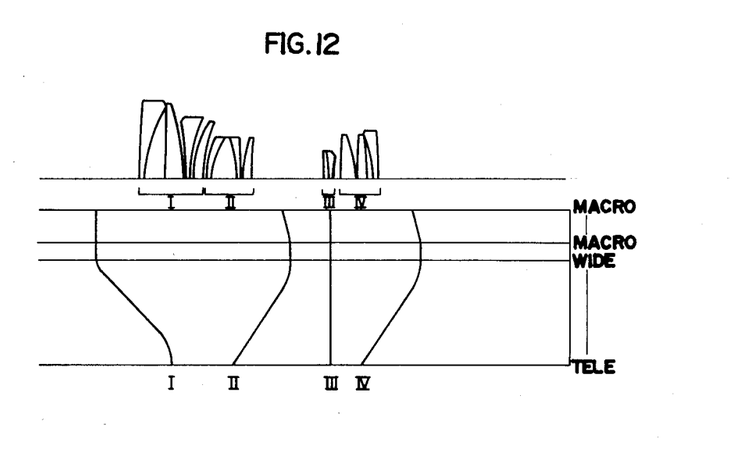
FIGS. 12 and 13 are longitudinal sectional views respectively showing the upper half of the optical systems of wide-macro type and tele-macro type zoom lens.
Figure 13:
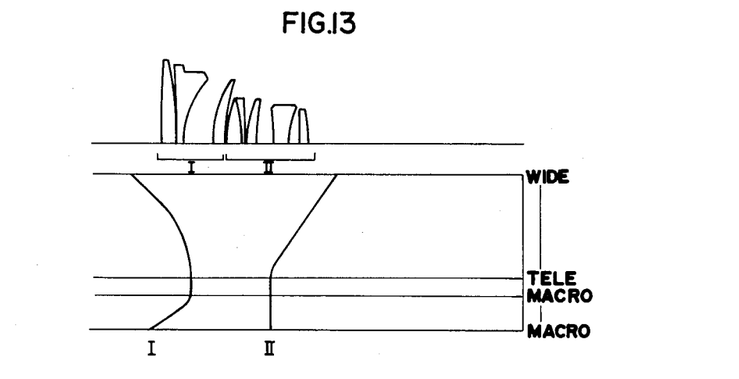

As to a zoom exchangeable lens which is adjustable for macro or close-up photography as well as for zooming, two types are known. One is a wide-macro type lens which is switched from the zooming to macro focus condition with a part of the lens elements being moved from a wide angle or widest angle condition of the lens system as shown in FIG. 12. The other is a tele-macro type lens wherein a part of the lens elements is moved from the tele or longest focal length condition of the lens system as shown in FIG. 13, in order to switch the lens from the zooming to the macro focus condition. In the wide-macro type lens as shown in FIG. 12, the first, second and fourth lens groups are moved with the third lens group being stationary for the zooming and the first lens group is moved independently for the focusing in normal range. The lens system is switched to the macro focus condition when the second and fourth lens groups are moved by the same amount with the first and third lens groups being left at their widest angle position. As the second and fourth lens groups are moved forward, the lens system will be focused at a nearer distance and the magnification of photography will increase.

In the case of the tele-macro type lens as shown in FIG. 13, the first and second lens groups are moved for the zooming and only the first lens group is moved for the focusing in ordinary range. The lens system is switched to the macro focus condition when the first lens group is moved with the second lens group being left at the longest focal length position. As the first lens group is moved forward, the lens system will be focused at a nearer distance and the magnification of photography will increase.

It is natural for those two types of zoom exchangeable lenses to be designed such that their zooming operation rings are to be rotated in the same direction for the adjustment of focal length from a tele to wide angle condition as well as that their focusing rings or focus adjusting rings are moved in the same direction for the adjustment of focus, in so far as those exchangeable lenses are adapted for use with the same type of camera. Further, the zooming operation ring is usually operated for the macro focusing in the range and direction of the extension from the zoom operation range. Hence, the zooming operation rings of the wide-macro and tele-macro lenses are to be rotated in the opposite directions for the adjustment of focus or focused distance in the macro focus range. In other words, the relationship between the direction of the focus adjusting operation and the change of the focused distance is opposite in the cases of the tele-macro and wide-macro zoom lenses.

The problem due to the inconsistency between the indication given by the focus aid device in the camera and the direction of rotational operation to be actually made, may be avoided if the above mentioned various exchangeable lenses are designed to have a unified direction of the rotational operation or to have a limited range of focus aid operation so that the indication is made correctly for the actual operation. However, such a particular design restricts the flexibility of lens designing and the exchangeable lenses so designed can not be used with cameras of other types or of other camera manufacture. Even in the case of exchangeable lenses to be used with one type of camera, there are limits for the designing of exchangeable lenses with respect to the direction of various operations. For instance, if the direction of zooming operation is unified, then the operational direction for focusing in the macro range can not be unified and vice versa. Hence, problems occur due to the inconsistency between the indication and the direction of operation to be made actually, for the cases beyond the limit.

SUMMARY OF INVENTION

It is an object of the present invention to provide exchangeable lenses which are used with a lens exchangeable camera and which are free from the above described problems in spite of different directions of the rotational operation of a focus adjusting means.

Another object of the present invention is to provide an exchangeable lens with which a lens exchangeable camera always indicates proper direction of rotational operation of a focus adjusting means of the lens towards an in-focus condition.

A further object of the present invention is to provide an exchangeable zoom lens in which focusing is adjustable without any problem for macro focusing as well as for zooming, with the rotational direction of a focus adjusting means of the zoom lens changing when operating condition is switched from macro focusing to zooming, and vice versa.

Still a further object of the present invention is to provide a focus detecting device which indicates proper rotational direction towards an in-focus condition even if the rotational direction of each exchangeable lens differs.

According to the present invention, an exchangeable lens is constructed to generate a rotational direction signal representing the relationship of the operational direction of a focus adjusting means and change of the camera-to-object distance and to transmit the rotational direction signal to a lens exchangeable camera having a focus aid function. The signal is used for indicating the proper rotational direction of operation of the focus adjusting means of the lens towards an in-focus condition. Accordingly, it is unnecessary to unify the rotational direction of the focus adjusting means in each exchangeable lens.

Additionally, in an exchangeable zoom lens of which focusing is adjustable for macro focusing as well as for zooming and requires two kinds of rotational directions opposite with each other, either one of the rotational direction signals is selectively generated in dependence on the operational condition of the zoom lens such as macro focusing and zooming. And the rotational direction signal is changed automatically and makes the indication of the rotational direction of operation of a focus adjusting means of the zoom lens always proper.

These and other objects, features and advantages of the present invention will become more apparent upon a reading of the following detailed specification and drawings.

DETAILED DESCRIPTION OF THE PREFERRED EMBODIMENTS

Figure 6:
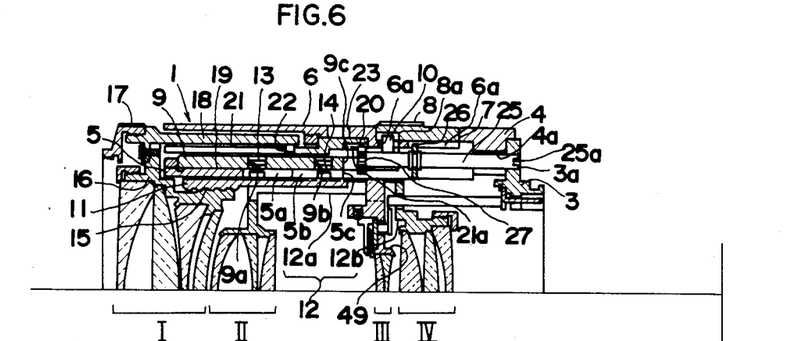
FIGS. 6 through 8 show longitudinal sectional views of the upper half of the lens shown in FIG. 2 with the zoom operating ring respectively assuming the shortest focal length position, the longest focal length position and the macro focusing position.
Figure 7:
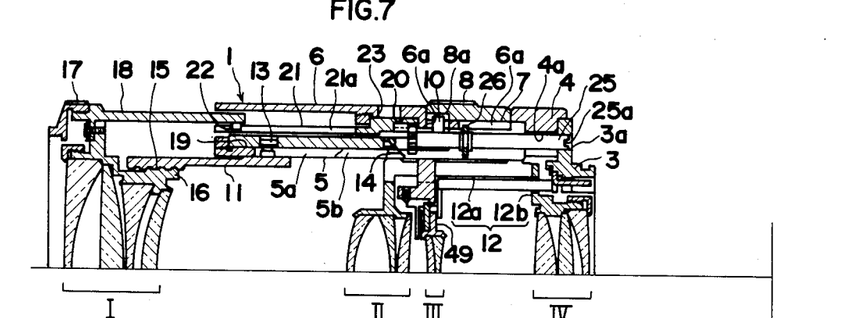
Figure 8:
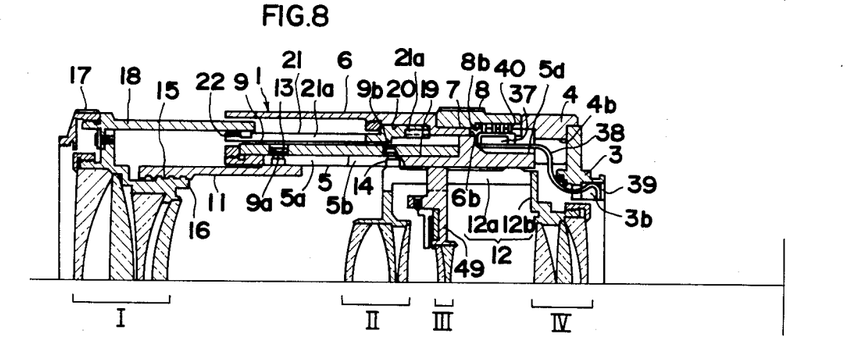

FIGS. 1 through 9 show a first embodiment of the present invention which is applied to an exchangeable zoom lens 1 of the wide-macro type as shown in FIG. 12 and including a barrel structure for automatic focusing. The exchangeable lens 1 is provided with a lens mount 3 fixedly formed at or connected to the rear end of a stationary barrel 4 and which has a bayonet structure for mounting the exchangeable lens 1 to a camera body 2 shown in FIG. 1. Referring to FIGS. 6, 7 and 8, the rear end of a stationary inner barrel 5 is fixedly connected to the inner cylindrical wall of the front end of the stationary barrel 4 to integrally couple the barrels 4 and 5. The rear end of outer stationary barrel 6 is connected to the outer periphery of the rear end of the fixed barrel 5 to couple the barrels 5 and 6 integrally. A zoom operation ring 8 is rotatably supported in the circumferential groove 7 formed between the rear end of the outer stationary barrel 6 and the front end of the stationary barrel 4. A zoom cam ring 9 is rotatably supported in the outer circumferential groove 19 of the inner stationary barrel 5. A cam follower pin 10 carried by the zoom cam ring 9 on the outer periphery of rear end of the ring 9, extends through a circumferentially elongated slot 6a and is received by a groove 8a formed on the inner peripheral wall of the zoom operation ring 8 and extending in the direction of the optical axis. The pin 10 transmits the rotation of the zoom operation ring 8 to the zoom cam ring 9 and restricts the angular range for the rotational operation of the zoom operation ring 8 by the abutment of the pin 10 with both ends of the elongated slot 6a.

A first movable frame 11 and second movable frame 12 are slidingly supported within or fitted into the inner circumference of the inner stationary barrel 5. The first and second movable frames 11 and 12 respectively carry cam follower pins 13 and 14 which in turn extend through linear guide slots 5a and 5b so that the first and second movable frames 11 and 12 can move in the direction of the optical axis. The cam follower pins 13 and 14 are respectively received by zoom cam slots 9a and 9b formed on the zoom cam ring 9 so that the rotation of the zoom cam ring 9 caused by the operation of the zoom operation ring 8 will move the pins 13 and 14 along the guide slots 5a and 5b by means of the cam slots 9a and 9b to drive the first and second movable frames 11 and 12 at a predetermined ratio.

A front lens group supporting frame 16 which supports a first lens group I, engages or is threaded into the inner circumference of the first movable frame 11 through a helicoid screw mechanism. The second movable frame 12 includes a front supporting frame 12a which supports a second lens group II, and a rear supporting frame 12b which supports a fourth lens group IV. A third lens group is fixedly supported by a stationary frame 49 which in turn is fixedly supported within the inner stationary barrel 5. With this structure, the first lens group I is moved by the first movable frame 11, while the second lens group II and the fourth lens group IV are moved by the second movable frame 12 with the third lens group III remaining stationary so that the zooming operation is performed.

The front lens group supporting frame 16 is connected with and is integral with a focusing ring 18 including a focus adjusting ring 17 which is located within the outer stationary barrel 6 and is exposed in front of the front edge of the outer stationary barrel 6. When the focus adjusting ring 17 is manually operated to rotate the focusing ring 18, only the front lens group supporting frame 16 is rotated by the helicoid mechanism 15 independently of the first movable frame 11 which is prevented from moving by the pin 13 and the guide slot 5a. Thus, the first lens group I moves back and forth to adjust the focused distance of the lens, i.e. effect focus adjustment.

Within the outer stationary barrel 6 is mounted a distance scale ring 21 which has its rear end rotatably supported within the circumferential groove 20 formed on the inner wall of the barrel 6 at an intermediate position in the axial direction. The front portion of the distance scale ring 18 that is before the supported end, is positioned between the focusing ring 18 an the zoom cam ring 9. The distance scale ring 21 is formed with an axial slot 21a which is open at the front end of the ring and which receives an interlocking pin 22 carried on the inner wall of the rear end portion of the focusing ring 18. With this structure, the distance scale ring 21 rotates integrally with the focusing ring 18 to indicate a set camera-to-object distance with a distance scale 24 which is observed through an indication or display window 23 of the outer stationary barrel 6.

The zoom operation ring 8 is designed to rotate beyond the ordinary zoom range into the macro range. The zoom cam ring 9 co-rotatable with the zoom operation ring 8 is formed with cam slots 9a and 9b. The cam slot 9a has a shape to leave the first movable frame 11 stationary in the axial direction when the zoom operation ring 8 is manually rotated in the macro range. The cam slot 9b has a shape to move the second movable frame 12 further in the axial direction in response to the operation of the zoom operation ring 8. Accordingly when the zoom operation ring 8 is rotated in the macro range, the second and fourth lens groups II an IV axially move with the first and third lens groups I and III remaining stationary to effect macro focusing.

A driven shaft 25 for the automatic focusing is mounted within a pocket formed by the inner wall 4a of the stationary barrel 4, the cut-out portion 5c at the rear end of the inner stationary barrel 5, the cut-out portion 6a at the rear end of the outer stationary barrel 6 and the cut-out portion at the rear end of the zoom cam ring 9. The driven shaft 25 is rotatably supported by a bearing hole 3a extending through the lens mount 3 and a bearing member 26 fixed on the outer stationary barrel 6. The end of the driven shaft 25 that is exposed from the bearing hole, is formed with a coupler 25a which is to be coupled with driving shaft (not shown) provided in the camera body 2 for the automatic focusing. To the end of the driven shaft 25 is fixed a transmission gear 27 which engages a driven inner gear 21a formed on the inner periphery of the rear end portion of the distance scale ring 21. With this construction, the driven shaft 25, receiving the driving force from the camera body for the automatic focusing, transmits the force through gears 27 and 21a, the distance scale ring 21 and the focusing ring 18 to the front lens group supporting frame 16 to cause such axial movement of the first lens group I as is caused in the case of manual focusing, thereby enabling automatic focusing.

On the outer periphery of the zoom operation ring 8 (see FIG. 2) are formed a focal length scale 28 for the normal zooming range and a macro focus scale 29 for the macro focusing range. The indicia 30 opposite to the distance scale 24 is formed on the outer circumferential surface of the outer stationary barrel 6. The indicia 31 formed on the outer circumferential surface of the stationary barrel 3 is to be registered with the focal length scale 28 and the macro focus scale 29.

Figure 1:
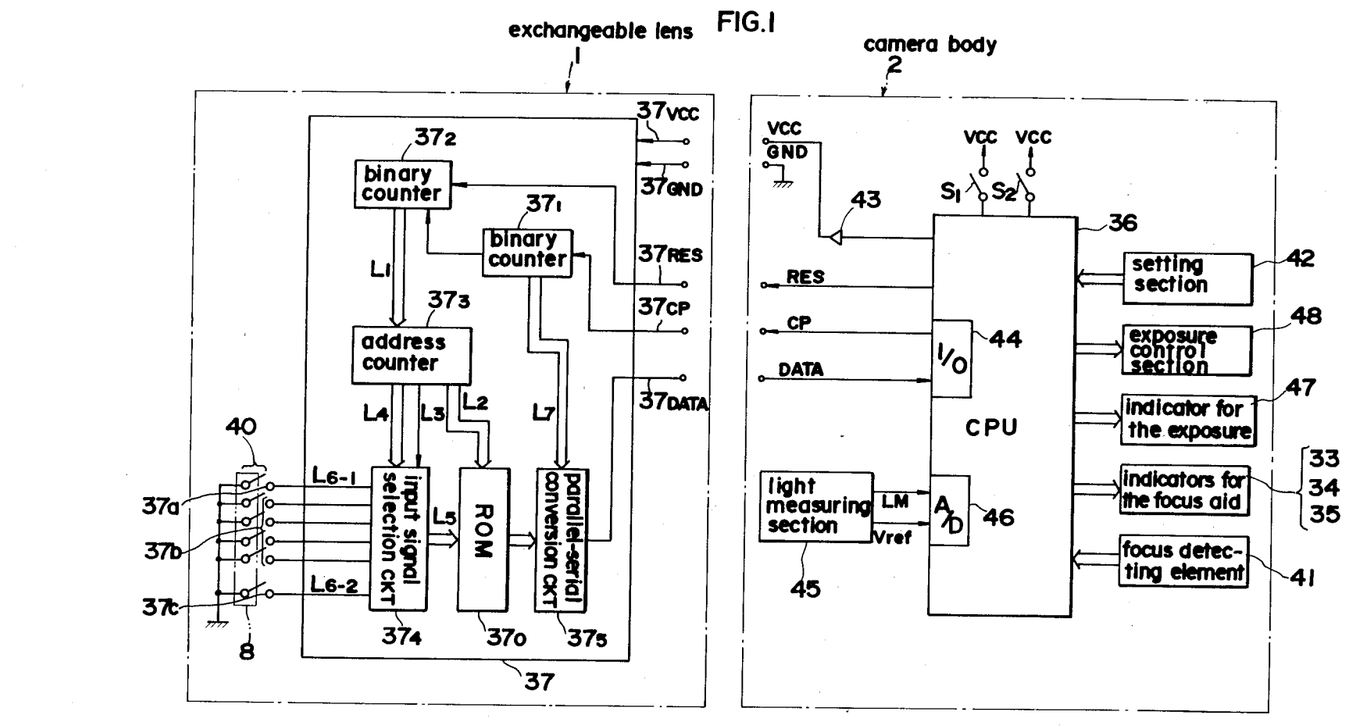
FIG. 1 is a circuit diagram of an exchangeable lens and a lens exchangeable camera according to one embodiment of the present invention.
Figure 2:
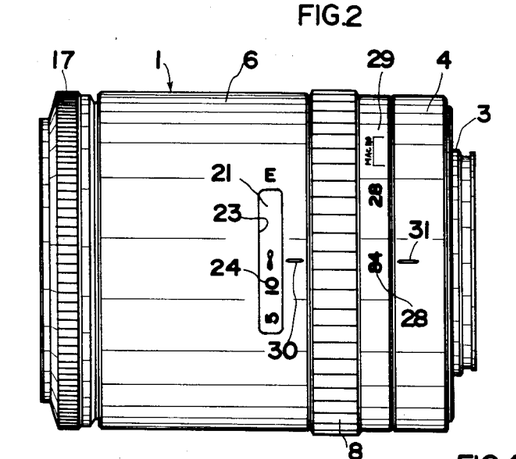
FIG. 2 is a plan view of the exchangeable lens shown in FIG. 1.
Figure 3:
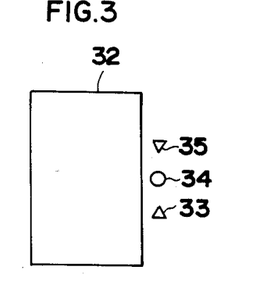
FIG. 3 is a schematic illustration of the viewfinder field in the camera as viewed in the direction corresponding to the direction of the lens in FIG. 2.

FIG. 3 shows the view 32 of the viewfinder in the camera body 2, the view being shown in the direction corresponding to the direction of the exchangeable lens 1 in FIG. 2. Along the bottom side (the right side in FIG. 3) are arranged indicators for the focus aid, i.e. a clockwise operation indicator 33, an in-focus indicator 34 and a counter-clockwise operation indicator 36. Those indicators are adapted to be lit or illuminated and indicate the directions of the focus adjusting operation as viewed from the film plane of the camera as well as the in-focus condition. The lighting or the illumination of the indicators are controlled by a CPU 36 provided in the camera (See FIG. 1).

Figures 4, 5:
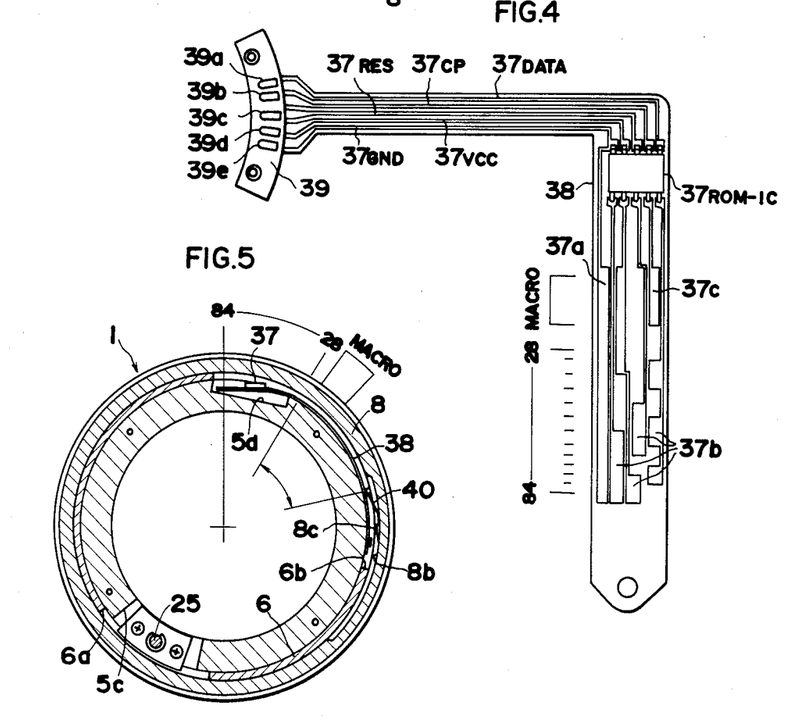
FIG. 4 is a plan view of a rotational direction signal generating means of one embodiment of the present invention.
FIG. 5 is a transverse sectional view of the lens shown in FIG. 2 with a zoom operating ring being at the longest focal length position.

The exchangeable lens 1 is provided with a ROM-IC 37 which bears various information to be supplied to the above mentioned CPU. The ROM-IC 37 is mounted on a flexible printed circuit board 38 which is adhered to the outer peripheral of the outer stationary barrel 5 at its rear end (see FIGS. 4 and 5). On the printed circuit board 38 are mounted electric signal lines 37VCC, 37GND, 37RES, 37CP and 37DATA extending in the direction of the optical axis and adapted for the power supply from the camera body and for the transmission of signals. The circuit board 38 is also provided with a grounding encoder contact 37a, zoom encoder contact 37b and macro encoder contact 37c.

The signal lines 37VCC, 37GND, 37RES, 37CP and 37DATA extend together with the circuit board 38 in the axial recess or cut-out portions 5d and 4b on the outer and inner stationary barrels 5 and 4, and reach to a terminal circuit board 39 wherein the lines are respectively connected with terminals 39a through 39e on the terminal circuit board 39. The circuit board 39 is mounted in the rear end portion of the axial recess or space formed interior of the lens mount 3 (see FIG. 8). An encoder brush 40 for supplying the data of the direction of manual operation is fixedly attached by caulking with a projection 8c to a recessed portion 8b on the inner wall of the zoom operation ring 8 which is opposite to the encoder contacts 37a, 37b and 37c, such that the brush 40 is selectively in contact with the encoder contacts 37a, 37b and 37c through the recess 6b at the rear end of the outer stationary barrel 6. (see FIG. 5).

The ROM-IC 37 carries in its ROM 37o various data that are proper to the exchangeable lens 1, such as the data of the fully open aperture value, the value of the minimum aperture, the focal length and the relationship between the direction of operation of the focus adjusting ring and the change of the camera-to-object distance to be focused on. The data of the relationship of the operational direction and the change of the focused distance serves as the operational direction data for the focus aid for the present invention. The focal length changes from 84 mm to 28 mm with the zooming position in the present embodiment. In order to obtain the data of the focal length commensurate with the zooming position, ROM 37o carries a given number of focal length data at respective addresses of the ROM 37o, one of which addresses is addressed by the signal produced by the zoom encoder 37b such that a focal length data corresponding to the zooming position is read out. To cope with the fact that the operational direction of the focus adjusting ring 17 or zoom operation ring 8 for changing the focused distance in the same direction differs on the cases when the zoom operation ring 8 is in the ordinary zooming range and in the macro range, ROM 37o stores the data of the two operational directions, and macro encoder contacts 37c is utilized for addressing the data of the operational directions in accordance with the position of the zoom operation ring 8, i.e. whether the ring is in the ordinary zooming or macro range. Thus, the data of the operational direction is read out in dependence on the position of the zoom operation ring 8.

ROM 37o also stores a code for checking the incomplete lens mounting. The code is read out first by the CPU36 in the camera body 2. When the proper code, e.g. "10101010" is read out, the CPU 36 decides that the lens has been properly mounted on the camera body 2, and treats various subsequent data as effective. When the proper code is not read out, the CPU36 decides that the lens 1 is improperly mounted on the camera body 2 and that the subsequent data are ineffective.

The F value of the fully open aperture and the F value of the minimum aperture (the aperture value when the aperture has been stopped down to its minimum size) are converted from the F values (F No.) to APEX values (AV) in accordance with a known conversion formula $AV=2\times \log_2 F$ No. and the data of the converted values are described in the ROM 37o by the unit of $\frac{1}{8}$ EV. For example, when an F value is 1.68, $AV=1+4/8$ and the data "00001100" is described in the ROM. When F No.=32, the data to be described, $AV=10+0/8$, i.e. "01010000."

The value for the compensation for the exposure error due to the difference of the fully open aperture value (hereinafter referred to as a full-open-aperture compensation value) is also described in the ROM 37o by the unit of $\frac{1}{8}$ EV like the F values of the fully open aperture and fully stopped down aperture.

The focal length f of the lens is described in the logarithmically compressed form F1, i.e. converted in accordance with the formula $F1=8\times \log (f/6.25)$. For example, the focal lengths f=50 mm, 100 mm and 200 mm are respectively described as F1=24="00011000", F1=32="00100000" and F1=40="00101000". Thus, when the value of the focal length is doubled, the converted value F1 increases by 8.

As to the data of the operational direction for the focus aid, a logic "1" is described in the ROM for an exchangeable lens having an optical system and a barrel structure wherein the focused distance, i.e. the camera-to-object distance to be focused on changes from the infinity focusing side to a nearer distance focusing side as the focus adjusting ring is rotated clockwise as viewed from the film plane of the camera. A logic "0" is described in the ROM for the lens wherein the opposite relationship lies between the operational direction of the focus adjusting ring and the direction of the change of the focused distance. Those data for the operational direction are to be read out by the microcomputer in the camera body.

As discussed before, macro-photography-capable zoom lenses of the tele-macro type and wide-macro type are generally designed for the convenience of operation such that the rotational operation direction of the zoom operation ring from its tele to wide angle position in the normal zoom range is the same as the rotational operation direction of the focus adjusting ring from the infinity focusing position to a nearer distance focusing position so far as the zoom lenses are produced by the same manufacturer and are adapted for use with the same type of camera body. Accordingly, if the rotational operation direction of the zoom operation ring from the infinity focusing side to the nearer distance focusing side in the macro range provided in the extension of the zoom range is made to coincide with the rotational operation direction of the focus adjusting ring of the tele-macro-type zoom lens, the operational directions do not coincide in the case of wide-macro-type zoom lenses.

For the sake of the design convenience, the data of the operational direction described in ROM 37o is logic "1" for both zoom and macro ranges of the tele-macro type zoom lens. On the other hand, for the wide macro type zoom lens shown as the embodiment, a logic "1" is described in an address n+1 of the ROM 37o for the rotational operation direction of the focus adjusting ring 17 while the zoom operation ring is in the normal zooming range. A logic "0" is described in an address n of the ROM 37o for the rotational operation direction of the zoom operation ring 8 for focusing in the macro range. Thus, in accordance with the exchangeable lens 1 being operated in the normal zooming range or macro range, the address storing the corresponding data of the operational direction is designated and the data in that address is read out to the camera body 2. In this case, the aforementioned macro encoder contact 37c is used for the designation of the address and the address is selected in accordance with whether the zoom operation ring is in the macro range or not.

The CPU 36 in the camera body 2 includes a focus condition calculating means or function which calculates the focus condition from the data of focus detection detected by the focus detecting element 41 in the camera body 2 and the data of the operational direction included in the read out from the ROM 37o in the lens 1. The CPU 36 discriminates from the result of the calculation whether the lens 1 is in a front focus condition wherein the focused distance is shorter than the actual camera-to-object distance, in an in-focus condition, or in a rear focus condition wherein the focused distance is longer than the actual camera-to-object distance. Additionally, in accordance with the data of the operational direction which is logic "1" or "0" as described above, the indicators 33, 34 and 35 in FIG. 3 are selectively energized as shown in Table 1.

TABLE 1

| Data of the operational direction | (the blackened indicator is energized) | | | | | | | | |
|---|---|---|---|---|---|---|---|---|---|
| | Result of focus detection | | | | | | | | |
| | Front focus | | | In-focus | | | Rear focus | | |
| | Indicator | | | | | | | | |
| | 33 | 34 | 35 | 33 | 34 | 35 | 33 | 34 | 35 |
| 1 | ▷ | ∴ | ◀ | ▭ | ● | ◁ | ▶ | ∴ | ◁ |
| 0 | ▶ | ∴ | ◁ | ▭ | ● | ◁ | ▷ | ∴ | ◀ |

With the above construction, the focus aid function of the camera body 2 with the indicators 33, 34 and 35 indicates the proper operational indication in compliance with the type of the exchangeable lens attached to the camera and the operational condition of the lens, with the indications being coincident with the actual operational direction.

Figure 9:
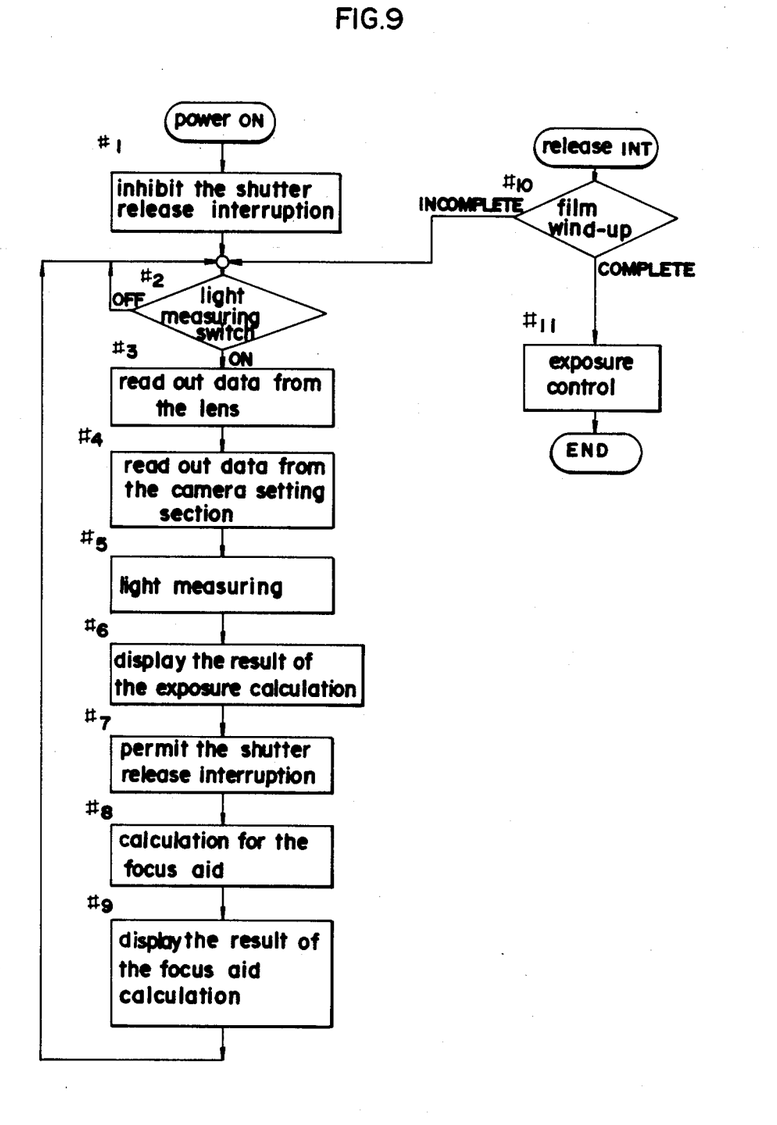
FIG. 9 is a flow chart showing the sequential operation of the camera shown in FIG. 1.

The construction and operation of the CPU 36 and ROM-IC 37 will be described in more detail with reference to FIGS. 1 and 9. When a power switch S1 in the camera body 2 is turned on, the CPU 36 initializes the data for the focus detection and the exposure calculation and inhibits the shutter release interruption (step #1). Then a light measuring switch S2 is turned on at step #2 after the initialization, the CPU36 enters the sequence of reading out data from the lens 1 (step #3). In the reading out sequence, a voltage VCC is first applied through buffer 43 to the ROM-IC 37 of the lens 1. After the commencement of the voltage application, a reset signal RES is turned "Low" from a "High" level to reset the circuit of ROM-IC 37. After the resetting, CPU 36 generates clock pulses CP which are applied to the 3-bit binary counter $37_1$ in the first stage of ROM-IC 37. The 3-bit binary counter $37_1$ at the first stage feeds, to a 3-bit binary counter $37_2$ at the second stage, one pulse for every eight clock pulses CP. The 3-bit binary counter $37_2$ of the second stage responds to the pulses fed from the 3-bit binary counter $37_1$, of the first stage and generates a signal L1 which is fed to an address decoder $37_3$.

The following table 2 shows the relationship between the inputs and outputs of the second stage 3-bit binary counter $37_2$.

The address decoder $37_3$, in accordance with the signal L1, generates signals $L_2$ and $L_4$ for designating the address of ROM $37o$. Th signal $L_2$ designates the upper three bits of the eight bits of address code. The signal $L_4$ designates the remaining lower five bits. The lower five bits of ROM $37o$ are also designated by the external signal $L_{6-1}$ derived from the grounded encoder contact $37a$ and the zoom encoder contact $37b$, and by the external signal $L_{6-2}$ derived from the macro encoder contact $37c$.

TABLE 2

| Inputs the order of input pulses | Outputs $L_1$ |
|---|---|
| 1 | 0 0 0 |
| 2 | 0 0 1 |
| 3 | 0 1 0 |
| 4 | 0 1 1 |
| 5 | 1 0 0 |
| 6 | 1 0 1 |

The signals $L_4$ and $L_6$ for designating the lower five bits of the address are alternatively selected within input signal selection circuit $37_4$ in accordance with another output signal $L_3$ fed from the address decoder $37_3$. The output signal $L_5$ from the selection circuit $37_4$ as the result of the selecting operation finally designates the lower five bits of the address in ROM $37_0$.

The following table 3 shows the relationship among the input and output signals $L_1, L_2 \ldots L_5, L_{6-1}, L_{6-2}$, of the address decoder $37_3$ and the input signal selection circuit $37_4$.

TABLE 3

| $L_1$ | $L_2$ | $L_3$ | $L_4$ | $L_{6-1}$ | $L_{6-2}$ | $L_5$ |
|---|---|---|---|---|---|---|
| 000 | 000 | 00 | 00000 | $a_4 a_3 a_2 a_1 a_0$ | b | 00000 |
| 001 | 001 | 01 | 00001 | $a_4 a_3 a_2 a_1 a_0$ | b | $a_4 a_3 a_2 a_1 a_0$ |
| 010 | 010 | 01 | 00010 | $a_4 a_3 a_2 a_1 a_0$ | b | $a_4 a_3 a_2 a_1 a_0$ |
| 011 | 000 | 00 | 00011 | $a_4 a_3 a_2 a_1 a_0$ | b | 00011 |
| 100 | 000 | 10 | 00100 | $a_4 a_3 a_2 a_1 a_0$ | b | 0 0 1 0 b |
| 101 | 011 | 01 | 00101 | $a_4 a_3 a_2 a_1 a_0$ | b | $a_4 a_3 a_2 a_1 a_0$ |

($a_4 a_3 a_2 a_1 a_0$ and b assume logic "0" or "1" level, and the level is "0" when the contacts $37a$ is connected with the contact $37b$ or $37c$, and "1" when the contact $37a$ is connected to neither of the contacts $37b$ and $37c$.)

From the table 3, it will be seen that if $L = "00"$, $L_5 = L_4$, that if $L_3 = "01"$, $L_5 = L_{6-1}$, and that a corresponding address is designated.

If $L_3 = "10"$, $L_5 = L_4$. But, only the lowest bit depends on the signal $L_{6-2}$ and if the grounded encoder contact $37a$ is not connected with the zoom encoder contact $37b$, the five bit signal will be "00101" to designate the n+1 address. If the grounded encoder contact $37a$ is connected with the zoom encoder contact $37b$, the five bit signal will be "00100" to designate the n address. Thus, two levels data "1" and "0" can be output.

Following table 4 shows the relationship between the addresses of ROM $37o$ and the kind of the data described therein.

- TABLE 4

| $L_1$ | Upper 3 bits $L_2$ | Lower 5 bits $L_5$ | Described data |
|---|---|---|---|
| 000 | 000 | 00000 | Incomplete mounting checking code |
| 001 | 001 | $a_4 a_3 a_2 a_1 a_0$ | Full open aperture value |
| 010 | 010 | $a_4 a_3 a_2 a_1 a_0$ | Fully stopped-down aperture value |
| 011 | 000 | 00011 | Full aperture compensation value |
| 100 | 000 | 0 0 1 0 b | Operational direction data |
| 101 | 011 | $a_4 a_3 a_2 a_1 a_0$ | Focal length data |

The data stored in the address designated by the signals $L_2$ and $L_5$ are fed by the ROM $37o$ to a parallel-serial conversion circuit 37 which converts one by one the eight bit parallel data to a eight bit serial data, for example, from the lowest bit. The timing of the conversion is controlled on the basis of the output $L_7$ of the first stage three bit binary counter $37_1$.

The logic of the conversion from the parallel to a serial data is shown in the following table.

TABLE 5

| $L_7$ | 8 bit serial data output | | | | | | | |
|---|---|---|---|---|---|---|---|---|
| 000 | 0 | 0 | 0 | 0 | 0 | 0 | 0 | 1 |
| 001 | 0 | 0 | 0 | 0 | 0 | 0 | 1 | 0 |
| 010 | 0 | 0 | 0 | 0 | 0 | 1 | 0 | 0 |
| 011 | 0 | 0 | 0 | 0 | 1 | 0 | 0 | 0 |
| 100 | 0 | 0 | 0 | 1 | 0 | 0 | 0 | 0 |
| 101 | 0 | 0 | 1 | 0 | 0 | 0 | 0 | 0 |
| 110 | 0 | 1 | 0 | 0 | 0 | 0 | 0 | 0 |
| 111 | 1 | 0 | 0 | 0 | 0 | 0 | 0 | 0 |
| | Upper most bit | | | | | | | Lowest bit |

In the order as described above, the data stored in the ROM $37o$ of lens 1 are read out.

The CPU 36 in the camera body 2 receives through I/O port the eight bit serial data which was read out from the ROM $37o$. Then, the CPU 36 reads out the data of set exposure mode, set aperture value AV, set shutter speed TV and so forth from a setting section 42 (step #4) and initiates the light measurement of the light measuring section 45 (step #5). The output LM of the light measuring section 45 along with the reference voltage Vref is input through A/D converter 46 to the CPU 36 which quantizes the output of the light measuring circuit 45. With reference to the set exposure mode, the CPU makes an exposure calculation with the quantized light measurement and the data of full open aperture value, fully stopped-down aperture value and the full open aperture compensation value that were read out from the lens 1. The result of the calculation is indicated by an indicator 47 to a necessary extent (step #6), and is also supplied to exposure control section 48.

At this stage, the CPU 36 cancels the inhibition of interruption (step #7), by the shutter release operation and enables shutter release operation. Then, the CPU 36 makes a calculation for the focus aid with the data from the lens 1 and the data from the focus detecting section 41 (step #8). After the result of the focus aid calculation is indicated (step #9), data are read out from the lens 1 again and those operations are repeated. When a shutter release operation is made, the CPU 36 instantaneously enters the interruption processing routine. If the film wind-up operation is completed (step #10), the control section 48 controls the shutter speed and diaphragm aperture in accordance with the result of the exposure calculation (step #11) and then the sequential camera photography operation is completed.

The definite camera and lens operation in each focusing mode will be explained.

In the case of automatic focusing mode, manual operation of a shutter release button to a first stage actuates a focus detection and calculation section (not shown) and an automatic focusing motor is driven in accordance with the output of the focus detection and calculation section. The driving force of the automatic focusing motor is transmitted to the driven shaft 25 in the exchangeable lens 1 to turn the helicoid screw 15 and the front lens supporting frame 16 through gears 27 and 21a, the focused distance scale ring 21 and the focusing ring 18, thereby shifting the first lens group I towards an in-focus position by a given amount. After the movement of the lens group I by the given amount, the focusing condition of the lens is detected again and the in-focus indication 34 in the viewfinder is energized and the automatic focusing motor is stopped to terminate the automatic focusing operation if an in-focus condition is detected.

Next, explanation will be made about the manual focus adjustment in accordance with the indication of the focus aid device. When the zoom operation ring 8 is in the normal zoom range for the focal length from 84 mm to 28 mm, the manual focusing operation is made with the focus adjusting ring 17. In this case, if the indicator 33 for indicating the clockwise rotational operation is observed as being energized, the focus adjusting ring 17 should be turned clockwise as viewed from the film plane. As the result, the objective lens approaches its in-focus position wherein the in-focus condition indicator 34 is energized to indicate the attainment of the in-focus condition. In other words, the indication of the clockwise rotational operation indicator 33 represents the rear focus condition wherein the exchangeable lens 1 is focused on a distance which is further than the target object.

In contrast to the above case, if the indicator 35 for indicating the counterclockwise rotational operation is energized, the counterclockwise rotation of the focus adjusting ring 17 causes the objective lens to approach its in-focus position and the in-focus condition indicator 34 is energized at a rotational position of the focus adjusting ring 17 to indicate the attainment of the in-focus condition. In this case, the indication of the counterclockwise rotational operation indicator 35 represents the near focus condition wherein the exchangeable lens 1 is focused on a distance which is nearer than the target object.

When the zoom operation ring 8 is rotated from the position for the focal length of 84 mm, i.e. the position for setting the objective lens 1 at the extreme telephoto condition as shown in FIG. 6, towards the position for the focal length of 28 mm, i.e. the position for setting the objective lens 1 at the extreme wide-angle position, the zoom cam ring 9 corotates with the zoom operation ring 8 so that the first and second movable frames 16 and 17 are moved along the optical axis at a given ratio of their moving speed, for the zooming by means of the zoom cam slot 9a and 9b, the cam follower pins 13 and 14, and the straight guide slots 16 and 17 until the objective lens 1 reaches the extreme wide-angle condition as shown in FIG. 7.

When the zoom operation ring 8 is rotated further beyond the extreme wide angle position, i.e. the position for the focal length of 28 mm as shown in FIG. 2, only the second movable frame 17 is moved to shift the optical system of the objective lens 1 to a macro focusing or photography condition as shown in FIG. 8 in which condition focus adjustment is made by the zoom operation ring 8.

If the above objective lens is arranged as a conventional lens, the clockwise rotational operation indicator 33 is energized for the rear focus condition wherein the objective lens 1 adjusted through the zoom operation ring 8 is focused on a distance which is further than the target objective, even when the zoom operation ring 8 is at any position within the macro range. This is because the rear focus condition is detected by the focus detection element 41 in the camera body 2 and the focus aid device makes the indication, even in the case of the macro focusing, directly in accordance with the output of the focus detection element 41 as in the case of normal zoom range. In this case, if the zoom operation ring 8 is rotated clockwise in accordance with the indication, the objective lens 1 is to be focused on further distance, i.e. adjusted towards its infinity focusing position and in-focus condition can not be attained. In contrast, the focus aid system according to the present invention, is designed such that the actual operational direction for the focus adjustment is decided on the basis of, on one hand, the defocus data representative of the defocus direction detected by the focus detecting element 41 and, on the other hand, the data of the operational direction which is proper to the objective lens 1 and which is stored in the ROM 37o of the lens 1. As a result, the counterclockwise rotational operation indicator 35 is energized for the rear focus condition. That is, the opposite indicator is energized as compared with the case of the normal zooming. When the zoom operation ring 8 is rotated counterclockwise in compliance with the indication, the objective lens 1 comes to be focused on a nearer distance and an in-focus condition can be reached. In the case of the front focus condition, the focus aid device energizes the clockwise rotational operation indicator 33 so that an in-focus condition can be reached with the operation of the zoom operation ring 8 in compliance with that indication.

In the above embodiment, the present invention was applied to the case wherein the exchangeable zoom lenses of both tele-macro type and wide-macro type have the same operational direction with respect to the operation of the focus adjusting ring from its infinity focused position to nearer distance focused position, and the operation of the zoom operation ring from its tele-photo to wide-angle position so that the rotational directions of the focus adjusting ring 17 and the zoom operation ring 8 from the further distance focused position to the nearer distance focused position are the same with each other in the exchangeable zoom lens of the tele-macro type, and the directions are opposite to each other in the exchangeable zoom lens of the wide-macro type. It is apparent to those skilled in the art that the invention can be applied to the opposite case. That is, in the case where the system of exchangeable lenses are designed such that the operational directions of the focus adjusting ring and the zoom operation ring from their further distance focused position to nearer distance focused position are the same with each other in the exchangeable zoom lens of the wide macro type, the operational direction to be indicated should be switched with the switching of the zoom operation ring between the normal zoom range and the macro range in the exchangeable zoom lens of the tele-macro type wherein the rotational operational directions of the rings disagree with each other for the focus adjustment.

Although the present invention has been described in connection with exchangeable zoom lenses capable of macro photography, the invention can be applied widely to focus adjustment of various optical instruments with a focusing function, such as normal exchangeable zoom lenses and lenses of a fixed focal length that have a focusing ring, and lens adapters or accessories that are mounted between a camera body and an exchangeable lens and that are provided with a focus adjusting mechanism. If the operational directions of their focus adjusting members are not the same for the adjustment of the focus in the same direction, the data of the operational direction may be changed or left unchanged in dependence on the type of the optical instrument and the operational condition of the same.

Figure 10:
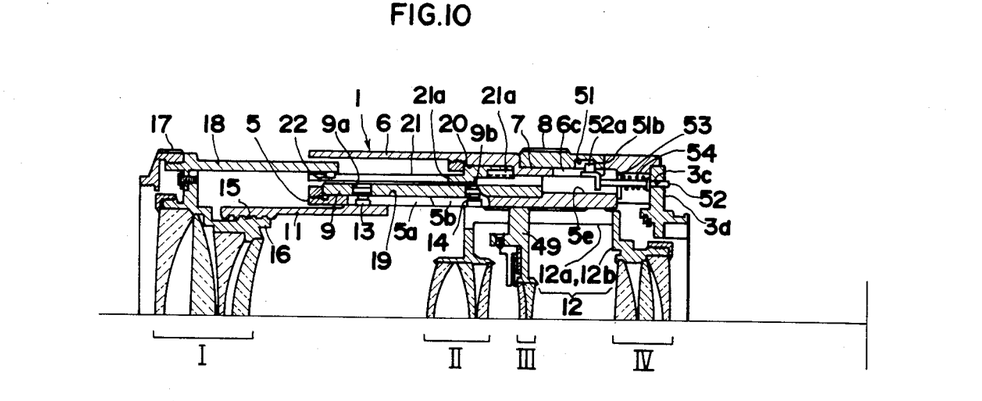
FIG. 10 is a longitudinal sectional view of half of a zoom lens of an alternate embodiment of the present invention.
Figure 11:
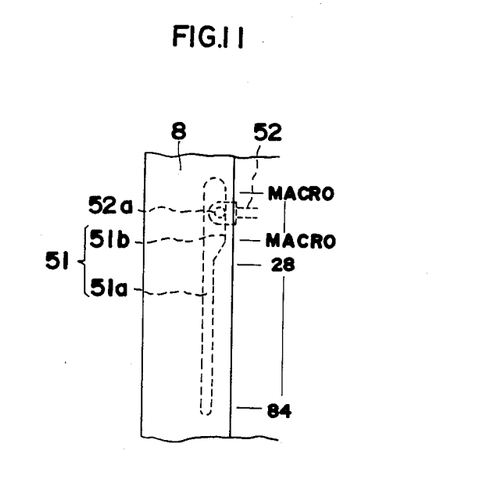
FIG. 11 is a fragmentary plan view of the zoom lens shown in FIG. 10.

Additionally, the data of the operational direction of the exchangeable lens may not necessarily be stored in the ROM of ROM-IC in the lens to be derived therefrom and transmitted to the camera body through electric signal lines. Instead, the signal derived from the encoder as a data of operational direction may be transmitted directly to the camera body. Further, a mechanical signal member may be employed to change-over a switch in the camera body and provides the information of the operational direction in the lens to the camera body. FIGS. 10 and 11 show an example wherein the information of the operational direction is provided by a mechanical signal member. With reference to FIGS. 10 and 11, a zoom operation ring 8 of an exchangeable lens 1 is formed on its inner wall with a circumferential cam groove 51 as a means for mechanically representing the operational direction. The cam groove 51 receives a follower pin 52a of a signal transmitting rod 52, the pin 52a extending through a cut-out portion 6c at the rear end of the outer stationary barrel 6. The signal transmitting rod 52 is supported by a bearing hole 3c formed on a mount 3 of the lens 1 and a bearing 53 fixed to the rear end of the cut-out portion 5e of an inner stationary barrel 5, the signal rod 52 is movable between positions projecting and retracting from the mount surface 3d, and urged by a spring 54 to its projecting position. The cam groove 51 is wider and extends further towards the camera body, in the range 51b in which the pin 52a lies with the zoom operation ring 8 being in a macro focusing range, than in the range 51a in which the pin 52a lies with the zoom operation ring 8 being in a normal zooming range.

With this construction, the signal transmitting rod 52 is retracted from the mount surface 3d against the force of the spring 54 with the follower pin 52a assuming a position in the narrower range 51a of the cam groove 51 while the zoom operation ring 8 is in the normal zoom range. When the zoom operation ring 8 is in the macro focusing range, the follower pin 52a assumes a position in the wider range 51b of the cam groove 51 so that the signal transmitting member 52 projects from the mount surface 3d by the force of the spring 54 as shown in FIG. 10. Although not shown, the projection and retraction of the signal transmitting member 52 changes over the switch in the camera body.

The mechanical transmission of the operational direction signal may be effected by another mechanism wherein an optical instrument requiring the switching of the operational direction has a projection for operating a switch in the camera body and an optical instrument which does not require the switching, does not has such a projection.

As many apparently widely different embodiments of this invention may be made without departing from the spirit and scope thereof, it is to be understood that the invention is not limited to the specific embodiments thereof except as defined in the appended claims.

What is claimed is:

1. An exchangeable lens for use with a lens exchangeable camera having a focus detecting means which receives light coming from a target object on which said exchangeable lens is focused and passing through said exchangeable lens and determines the focus conditon and the direction of defocus, and means for indicating the determined focus condition and direction of focus adjustment, said exchangeable lens comprising:
   a lens system for forming an image of the object, said lens system including a movable element for the focusing of said lens system;
   a focus adjusting means manually operable for moving said movable element;
   a direction signal means for determining and indicating the direction of focus adjustment, said direction signal means generating two direction signals each representing a relationship between the direction of operation of said focus adjusting means and the change of the camera-to-object distance to be focused on by said lens system, said direction signals respectively representing relationships that are opposite to each other;
   means for generating a selection signal;
   means for selecting either one of said direction signals in response to the selection signal; and
   means for transmitting the selected direction signal to said focus detecting means of said camera, said focus detecting means being responsive to said selected signal when determining the direction of the focus adjustment.

2. The exchangeable lens according to claim 1 wherein said lens system is operable in two operating conditions respectively requiring said focus adjusting means to be operated in opposite directions to change the focusing in the same direction, and said means for generating generates the selection signal in accordance with the operating condition of said lens system.

3. The exchangeable lens according to claim 2, further comprising a zoom operation ring adjustable for macro photography as well as for zooming and movable in the normal zoom range for zooming and the macro focusing range for macro photography, said two operating conditions of said lens system being the cases when said zoom operation ring is in the normal zooming range and in the macro focusing range, and said zoom operation ring serving as said focus adjusting means in the macro photography range.

4. A focus detecting device for a camera comprising:
   an objective lens for forming an image of an object to be photographed, said objective lens including a lens system operable in two operating conditions respectively requiring said focus adjusting means to be operated in opposite directions to change the focusing in the same direction;

a focus detecting element which receives the light coming from the object and passing through said objective lens;

a manually operable focus adjusting means for adjusting the focus of said objective lens;

a direction signal means for determining and indicating the direction of focus adjustment, said direction signal means generating two direction signals respectively representing the opposite relationships between the direction of operation of said focus adjusting means and the change of camera-to-object distance to be focused by said objective lens;

means for generating a selection signal in accordance with the operating condition of said lens system;

means for selecting either one of the direction signals in response to the selection signal;

focus condition determining means, responsive to the output of said focus detecting element and the selected direction signal, for determining the focus condition and the direction of operation of said focus adjusting means to attain an in-focus condition; and display means responsive to the output of said focus condition determining means for displaying the focus condition and the direction of operation of said focus adjusting means determined thereby.

5. The focus detecting device according to claim 4, wherein said objective lens includes a zoom operation ring manually operable in a normal zoom range for zooming and a macro focusing range for macro photography, said two operating conditions of said lens system being the cases when said zoom operation ring is in the normal zooming range and in the macro focusing range, and said zoom operation ring serving as said focus adjusting means in the macro focusing range.

* * * * *